United States Patent [19]

Zimmer et al.

[11] Patent Number: 5,016,859

[45] Date of Patent: May 21, 1991

[54] WIRING HARNESS INSTALLATION ACCESSORY

[75] Inventors: Anita F. Zimmer, Birmingham; Ronald R. Billbury, Algonac, both of Mich.

[73] Assignee: The Mead Corporation, Dayton, Ohio

[21] Appl. No.: 420,355

[22] Filed: Oct. 12, 1989

[51] Int. Cl.⁵ .............................................. B65H 59/00
[52] U.S. Cl. .............................. 254/134.3 R; 174/135
[58] Field of Search ................. 29/235, 865, 855, 858, 29/451; 254/134.3 R, 134.3 FT; 53/255; 174/135, DIG. 8

[56] References Cited

U.S. PATENT DOCUMENTS

| | | | |
|---|---|---|---|
| 4,338,970 | 7/1982 | Krackeler et al. | 29/235 |
| 4,602,763 | 7/1986 | Gaylin | 254/134.3 FT |
| 4,761,872 | 8/1988 | Buettner et al. | 29/23.5 |
| 4,878,653 | 11/1989 | Brown | 254/134.3 FT |

OTHER PUBLICATIONS

Federal Standard No. 751a, Jan. 25, 1965, Superseding Fed. Std. No. 751, Aug. 14, 1959, Stitches, Seams, and Stitchings.
Van Nostrand's Scientific Encyclopedia, Seventh Edition, Copyright 1989, section on Fibers, pp. 1135–1139.

Primary Examiner—Robert C. Watson
Attorney, Agent, or Firm—Brooks & Kushman

[57] ABSTRACT

An accessory for assisting in installing a wiring harness in the form of an installation kit including a rigid tube and an expandable, separable reusable cloth sleeve equal in length to the wiring harness; and a method of installing the sleeve on the wiring harness which includes axially folding the cloth sleeve on the rigid tube, running the tube on the harness, and pulling the sleeve off the tube onto the harness as the tube is withdrawn, installing the wiring harness within an apparatus and thereafter separating the cloth sleeve so that it falls from the wiring harness.

12 Claims, 3 Drawing Sheets

WIRING HARNESS INSTALLATION ACCESSORY

TECHNICAL FIELD

The invention relates to the assembly and installation of electrical wire harnesses and similar componentry, particularly to that of preparing an electrical wire harness for installation in an automotive vehicle.

BACKGROUND OF THE INVENTION

With the advent of the mass produced automobile, techniques are constantly being developed to decrease the total time of production and lower the cost of production through these improved techniques. This has been particularly important in recent years with increased global competition in all world markets. At the same time, automobile designers are incorporating into the automobile a great number of electrical apparatus for monitoring or controlling various componentry associated with the vehicle's performance. Where there were relatively few electrical wires running from the interior control panel of the automobile to the engine compartment, there is now a great number. It has previously been found advantageous to bundle all of these wires coming from various points within the control panel into a single wiring harness of sufficient length to extend into the engine compartment to all points where connection to individual electrical components is desired.

Another option formerly in use was to, in effect, split the wiring harness along its length and to provide a common integrated electrical coupling at each end of the wiring harness formed at the split. Thus the wires from the control panel would terminate at a coupling member, preferably within the interior of the vehicle and just to the rear of the control panel. The main wiring harness would then comprise a complementary coupling member and an extended harness extending into the engine compartment.

In either case, the individual wires in the wiring harness are then held together in a bundle by means of electrical tape wound in continuous fashion around the circumference of the bundle throughout its length, or plastic bayonet type clips may be used to secure the wires at various points along the length of the wiring harness Either way, at some point along the length of the wiring harness, the individual wires extend beyond the bundle of wires as a free wire having at the unbound end an electrical component of some sort for connection to a respective electrical apparatus or electrical control for monitoring some mechanism.

In the prior art of preparing the abovedescribed wiring harness for shipment with the control panel to the place of installation and for installation in the vehicle, it has been the common practice to secure the free ends of the individual wires to the wrapped bundle by means of temporarily strapping them to the side of the wiring harness with paper tape. The paper tape is wound around the wire at the end so as to not only secure the wire but also cover the electrical component to protect it. Often times this means perhaps a dozen separate paper tape windings on a single wiring harness to cover the components. At the installation site, the control panel is first installed and then the wiring harness is inserted through an opening in the dash panel or wall separating the vehicle interior and control panel from the engine compartment.

Often times the opening in the wall is provided with a thick rubber grommet which holds the wiring harness in slight interference fit and protects the relatively soft wires in the harness from abrasion by the edges of the opening in the wall member. It also precludes cold air, dust and noise from passing from the engine compartment into the interior of the vehicle. Conventionally, the rubber grommet is preassembled on the wiring harness so that once the wiring harness has been pulled through to the engine compartment, the grommet is snapped in place in overlapping engagement with the edges of floor pan defining the opening. It is important that during installation when the wiring harness is passed through the floor pan opening, from the direction of the interior compartment to the engine compartment, the entire wiring harness pass through with ease and without pulling, snagging on, or cutting on the individually bundled wires or the electrical apparatus at the free ends of such wires. The paper tape precludes this.

Obviously wrapping the wiring harness with paper tape at a dozen different positions is a labor intensive process. Further, after installation and prior to making the electrical connections, the paper tape must be removed. This also takes additional time coupled with the fact that during the process of removal, if one is in haste or simply pulls on the connector instead of carefully unwrapping the tape, the electrical apparatus themselves may become detached from the free ends of the wire or the electrical connection damaged thus making the harness useless. This means the harness must be repaired, and thus more time is lost. In some cases the entire wiring harness may have to be scrapped. It is also possible that the damage may go unnoticed; thus making the eventual repair all the more costly.

There was also in use prior to the present invention, the practice of wrapping the entire harness in a shrink film. As with the other prior art systems described above, such a technique makes difficult the freeing of the individual wires and electrical connectors.

SUMMARY OF THE INVENTION

The subject invention has for its objects and advantages over the prior art:

1. a reduction in cost and time in preparing a electrical wiring harness for installation;

2. eliminating the time required to unbind the individual electrical wires of the wire harness after it is installed, so that the wiring harness is returned to its original and usable state within a minimum time and at minimum cost;

3. to make unnecessary the binding of the individual wires of the wiring harness by means of the multiple paper tape wrappings or the application of a shrink film;

4. to provide an apparatus and method for temporarily binding the individual electrical wires of the harness to the bundle in preparation for installation in one movement or process;

5. to unbind the temporary wrapping of the individual wires of the wiring harness following installation in one single movement or process;

6. to provide a kit for preparing the wiring harness for installation which is simple in construction, low cost and reusable and;

7. to provide a kit for preparing a wiring harness for installation which leaves no scrap materials.

In more specific terms, the invention contemplates a method of installing a wiring harness comprising wrapping said wiring harness in a flexible sleeve by stretching the sleeve over the wiring harness in telescoping relation so as to closely hold to the bundle each electrical wire and associated apparatus or connector, then inserting the wrapped wiring harness into a position approximating its final installed position, and thereafter breaking or separating the flexible sleeve at all points along a seam extending the full length of the sleeve, and removing the flexible sleeve from the wiring harness.

Further, the invention contemplates a method of installing a wiring harness as above described within a vehicle including wrapping the harness in a flexible sleeve made of a stretchable fabric, placing the stretchable fabric of the sleeve in tension as it is stretched over the harness, inserting said wrapped wiring harness through the wall member separating the vehicle interior from the engine compartment to a point approximating its final installed position, and then breaking the sleeve substantially instantaneously at all points along its seam, and removing it from the wiring harness.

The invention also contemplates an installation kit for installing a wiring harness comprising a substantially rigid tube, a flexible fabric sleeve of a length considerably greater than the rigid tube being stretched over the rigid tube and folded thereon the rigid tube from its leading end thereby having a folded length no greater than the rigid tube, and wherein the flexible tube has (i) a separable seam closed by a quick-release type chain stitch, and (ii) a stitch release means for quickly releasing the chain stitch beginning at one end of the flexible tube.

Further, the invention contemplates a method of wrapping a wiring harness for temporarily assisting in its trouble-free installation by running the aforesaid installation kit over the harness to a point of beginning and then pulling the sleeve off the rigid tube as it is run off the harness.

Other objects and features of this invention will be either specifically pointed out or otherwise apparent from the following description taken in conjunction with the accompanying drawings.

DETAILED DESCRIPTION OF THE PREFERRED EMBODIMENTS

Figure 1:
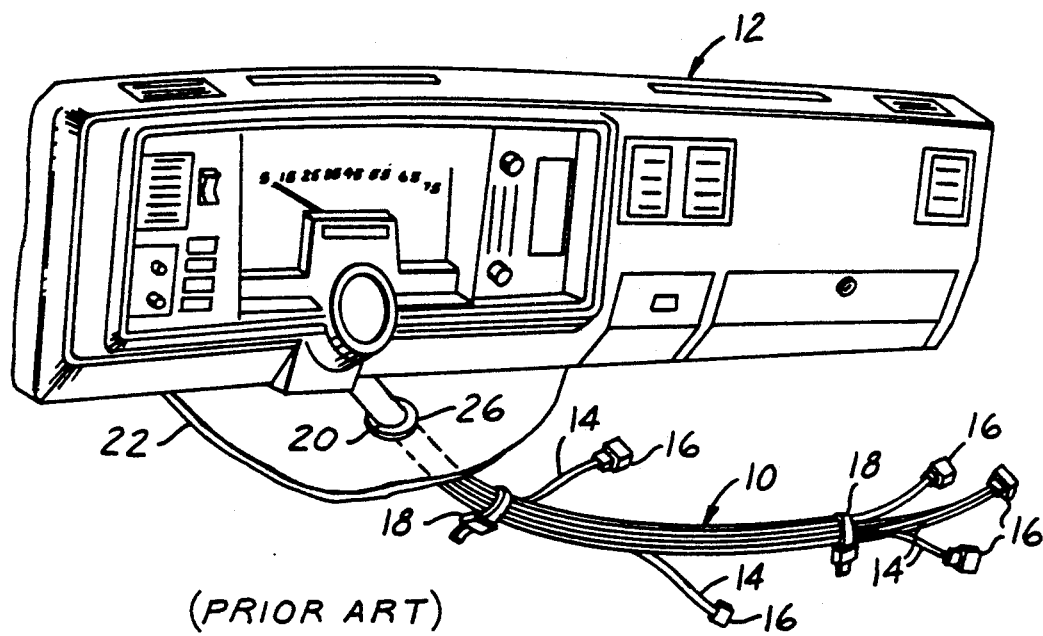
FIG. 1 is a perspective view showing the general environment of the subject invention including a wiring harness extending from the rear of a control panel into an engine compartment of a vehicle.

In FIG. 1, there is shown a wiring harness 10 extending from the rear end of a control panel 12. The wiring harness comprises a bundle of individual electrical wires 14 each of which has at its terminal end an electrical connector or component 16. Each electrical connector 16 is adapted to be attached to various electrical apparatus in the engine compartment of the vehicle for purposes of controlling the apparatus or, in some instances, monitoring the operating conditions of the vehicle.

Common practice is to connect all of these wires within the control panel prior to the control panel being installed within the vehicle. In this condition the wires are bundled together by means of quick connect bayonet type plastic fasteners 18 installed at various points along the length of the wire harness. This leaves the individual wires dangling at their free end, i.e. the end to which is attached the electrical connectors 16.

It is also conventional practice to first install the control panel within the interior of the vehicle, and then to pull the wiring harness through an opening 20 in wall member 22 or dash panel, separating the interior of the vehicle from the engine compartment 24. The opening 20 is sized to receive and hold a thick rubber grommet 26 fixed to the wiring harness initially, i.e., prior to installation. Grommet 26 is designed to snap into place as the harness is pulled through opening 20. Once installed, it protects the wires in the harness from abrading or tearing against the edges of the hole in the wall member 22 during use on the road. For convenience and added protection, the harness may be wound with electrical tape 27 at this particular locale. However, since grommet 26 is normally preassembled to the wiring harness, this raises the problem that when the wiring harness is drawn through the opening of the vehicle interior through the engine compartment, the components 16 on free ends of the individual wires are subject to being torn off at the opening 20. Conventional practice has been to wrap each of the individual wires at their respective ends, and including the electrical connectors 16, with paper tape. Thus, if there were eleven individual wires 14, there would be eleven paper tape wrappings to be made around the harness prior to its being pulled through to the engine compartment. Once the harness is pulled through the opening 20, then these eleven individual paper tape wrappings would have to be cut or torn or otherwise pulled away from the harness to allow the individual wires to be connected to the electrical apparatus (not shown) being controlled or monitored.

Figure 2:
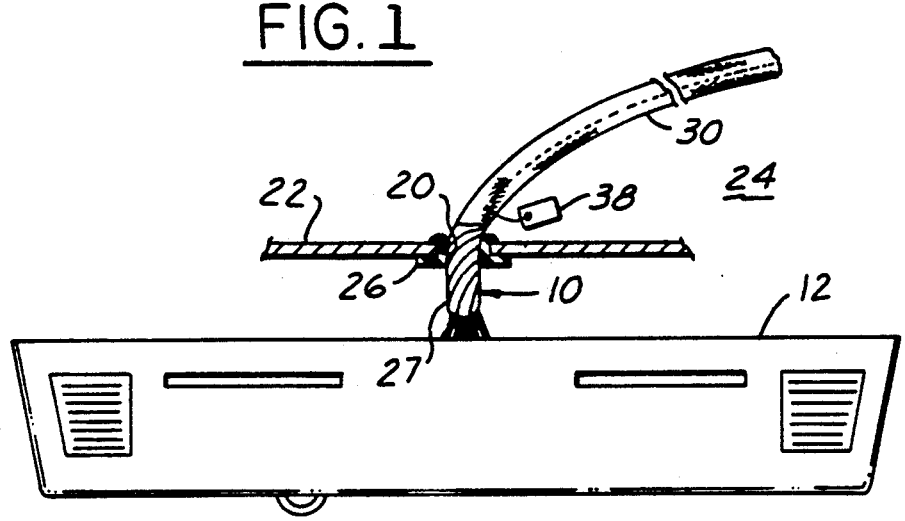
FIG. 2 is a partial plan of the wire harness installation shown in FIG. 1 and showing the wire harness wrapped in a flexible sleeve in accordance with the subject invention, during installation.

As shown in FIG. 2, it is part of our invention that the wiring harness be wrapped in a flexible, expandable, cloth sleeve 30. The single cloth sleeve 30 is a replacement for the numerous paper tape wrappings previously described. As with the paper tape wrappings, the sleeve is installed about the harness prior to its being pulled through the opening 20 of dash panel 22. It will be seen that the flexible sleeve is formed from a flat sheet of cloth which is wrapped to form a hollow sleeve joined at the ends 32, 34 by stitching 36 so as to form a seam running lengthwise of the sleeve. At one end of the seam there is inserted through the last stitch forming the seam a rupturable, pull type, quick release mechanism 38, when pulled will release the stitches along the entire seam.

As explained more fully below, the expandable sleeve is sized such that when it is installed on the harness as shown in FIG. 2 it is significantly circumferentially expanded so that a high degree of hoop stress is present on the stitches 36 holding the seam of the sleeve 30 together. Once the harness is installed as shown in FIG. 2, one pulls the member 38 to free the stitch. Immediately upon doing so the sleeve will literally and instantly separate along the entire length of the sleeve thus allowing the sleeve to be removed from the harness, or drop from the harness. This then places the harness in the condition as shown in FIG. 1 for its final connection to the electrical apparatus in the engine compartment.

Figure 3:
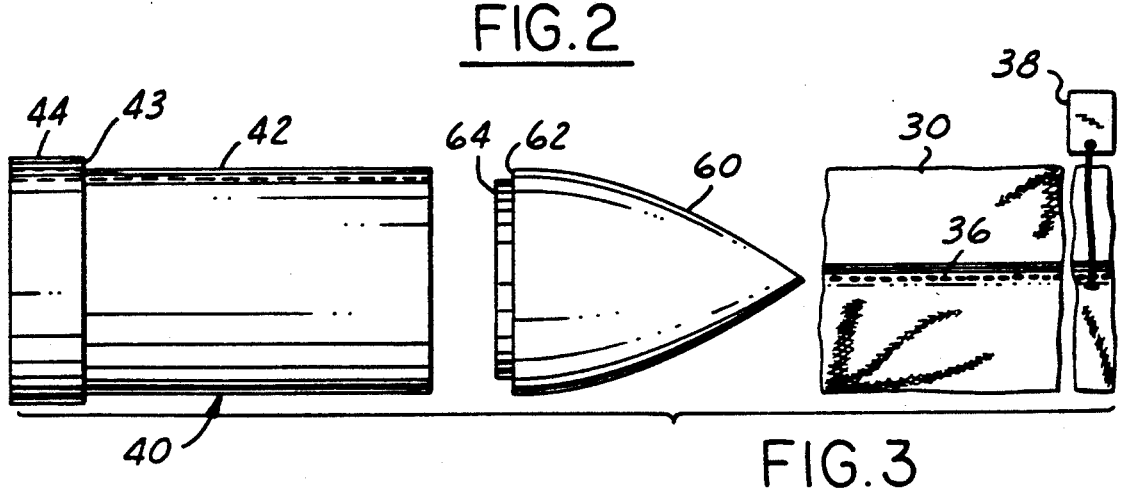
FIG. 3 is an exploded side view showing the installation in accordance with the subject invention.
Figure 4:
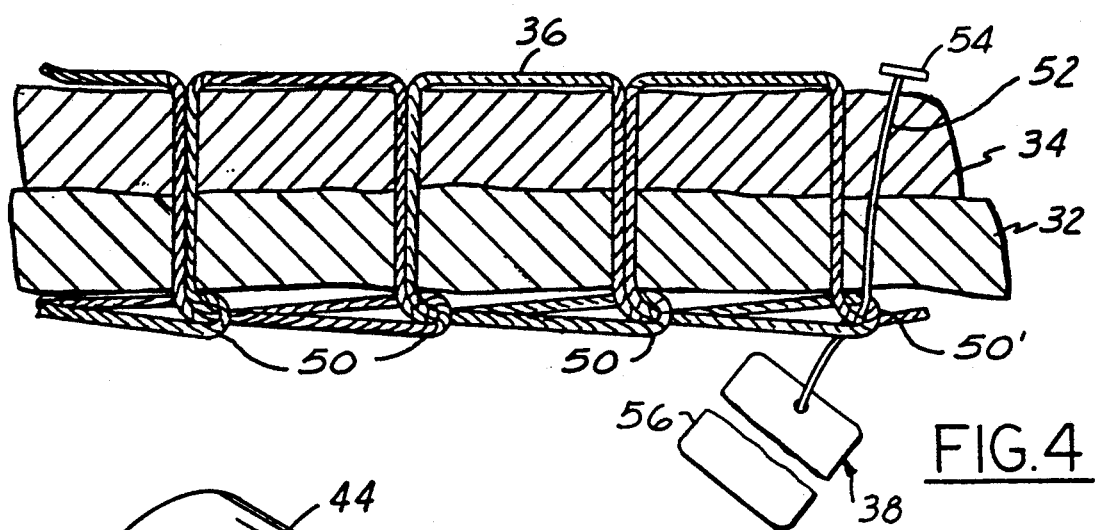
FIG. 4 is a detailed view of the sewing stitch used in construction with the flexible sleeve forming a part of the subject invention.
Figure 5:
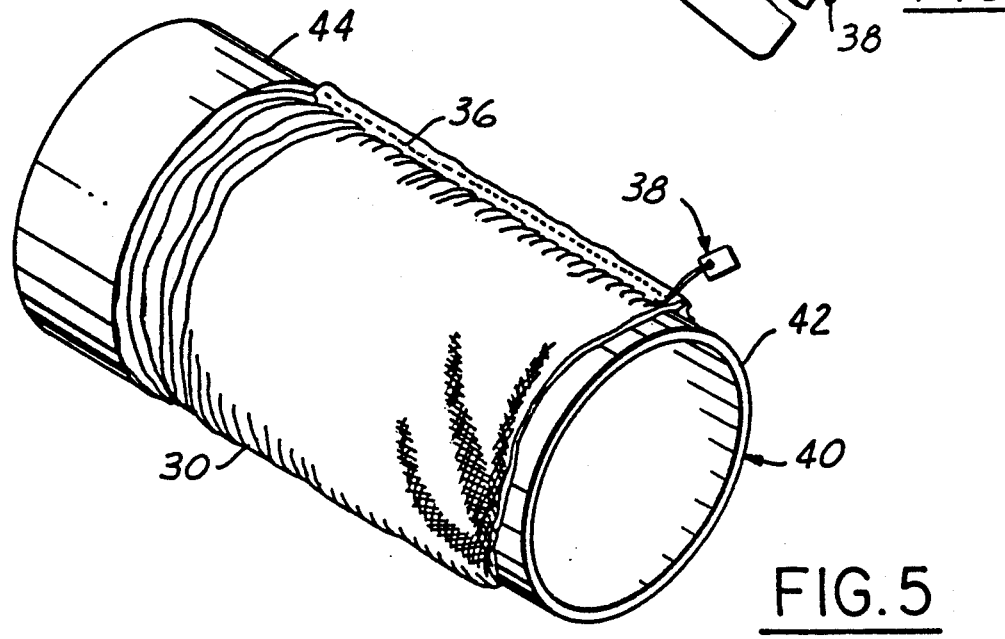
FIG. 5 is a side view of the installation kit with the flexible sleeve mounted on the installation tube prior to being installed on the wire harness in accordance with the subject invention.

FIGS. 3-5 show the detail of the actual installation kit. Basically the kit comprises a relatively rigid tube 40 and the flexible expandable cloth sleeve 30. Tube 40 comprises a barrel portion 42 and a stop shoulder portion 44 located at one end of the tube. The tube can be constructed in a number of ways. For simplicity and cost reasons, a tube made of paperboard, i.e. a wrapped paper roll is preferred. The barrel portion 42 is provided with a glassine finish along its entire outer circumference and length. The characteristics of the finish include its being smooth and relatively non-porous so as to present a much lower coefficient of friction to the sleeve which must be slipped on and off its surface. The stop shoulder portion 44 in this case preferably includes a ring section from another, larger I.D. cardboard tube, which is glued to the end of the barrel portion 42. The lead end 43 of the stop shoulder portion 44 stops the sleeve material 36 as it is gathered on the tube in the manner described below.

Sleeve 30 is preferably made of a relatively light stretch material comprising approximately 85% nylon fiber and 15% spandex fiber. A preferred material weight is approximately 4.75 ounces per square yard.

The preferred weave for the sleeve material is a two-way stretch weave with there being approximately 170% stretch or elongation about the circumference of the sleeve 30 and approximately 80% stretch along the length of the sleeve 30, i.e., a near 2:1 ratio.

The material is available in rolls. We prefer the roll to be of a width equaling the length of the sleeve to be formed. The material can then be cut from the roll in lengths equaling the circumference of the wiring harness to be sleeved. The construction of the sleeve is completed by folding it lengthwise and running a stitch at the free ends of the folded sleeve along its entire length as shown in FIGS. 3 and 4.

As shown in FIG. 3, the stitch 36 is run the entire length of the flexible sleeve 30 to form a seam. The preferred seam type as depicted in FIG. 3 is that designated under Federal Standard No. 751(a) as seam type SS(a)-1. Federal Standard 751(a) is a standard approved by the Commissioner, Federal Supply Service, General Services Administration, for use of all federal agencies, and the subject matter thereof is incorporated herein by reference.

The preferred stitch is that which is designated by Federal Standard 751(a) as chain stitch 101 and depicted in FIG. 4. It will be seen that the stitch is formed by a single continuous thread into a series of interlocking loops 50, 50'. At the end of the seam there is inserted a rupturable plastic pull tag 38. This type of pull tag is common in the garment industry and is known as a SWIFTACHMENT fastener. SWIFTACHMENT is a registered trademark of the Dennison Company. The fastener includes a plastic stem 52 inserted through the last loop 50 along the seam and having at its free end an elongated end portion 54 integral at its midpoint with the stem 52. At the opposite end there is secured to the stem a paper tag 56 which is adapted to be grasped by an operator's hand and pulled when it is time to release the seam stitch. Upon pulling the paper tag 56 of the fastener, stem 52 breaks at its juncture with end portion 54, thus allowing the seam to unravel as described in greater detail below.

To complete the installation kit, the sleeve is slipped over barrel portion 42 of rigid tube 40 until it abuts stop shoulder 43. Then it is folded or gathered along its length, generally in the form of a bellows, until all of the sleeve is folded upon the tube as seen best in FIG. 5. To assist in expanding the sleeve material and fitting it over the tube 40, the lead end of the tube is temporarily provided with a separable cone shaped mandrel 60, the base 62 of which equals the outer diameter of barrel section 42. The reduced diameter end portion 64 slips into the lead end of barrel section 42 in slight interference fit until the stop shoulder formed at the junction of the end portion 64 with base portion 62 abuts the lead end. After slipping the sleeve 30 onto barrel portion 42 of tube 40, the mandrel is removed. Mandrel 60 is preferably provided with the same glassine finish provided the tube 40. The sleeve is arranged such that the SWIFTACHMENT fastener for releasing the seam is positioned at the lead end of the tube 42.

For most automotive applications to date, we have found that an installation kit having components sized in accordance with the following meets most application requirements. Larger or smaller diameters and sleeve lengths however can be utilized as needed to suit the particular application.

Figure 6:
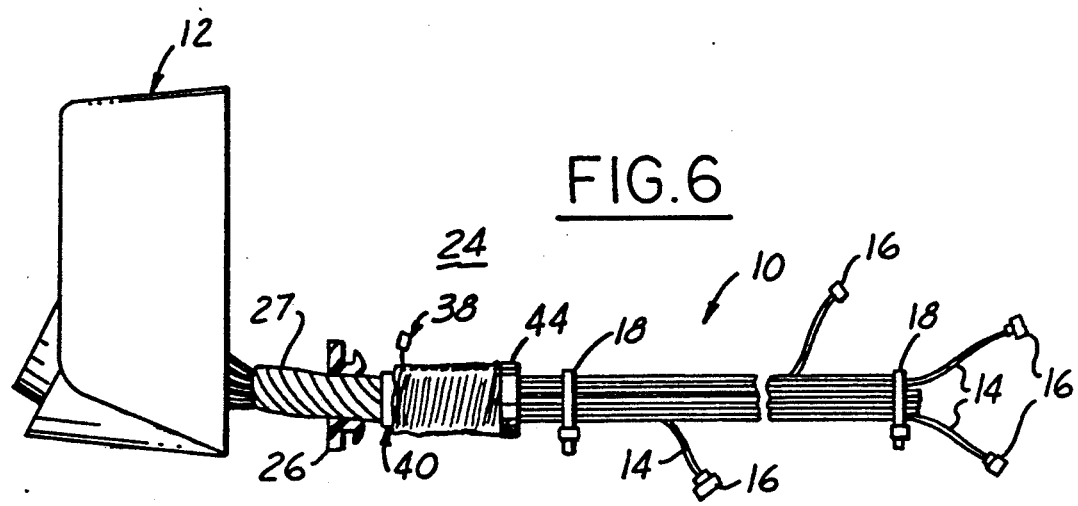
FIG. 6 is a sideview of the wiring harness extending from the rear of the control panel and in the process of being wrapped with a flexible sleeve in accordance with the present invention.
Figure 7:
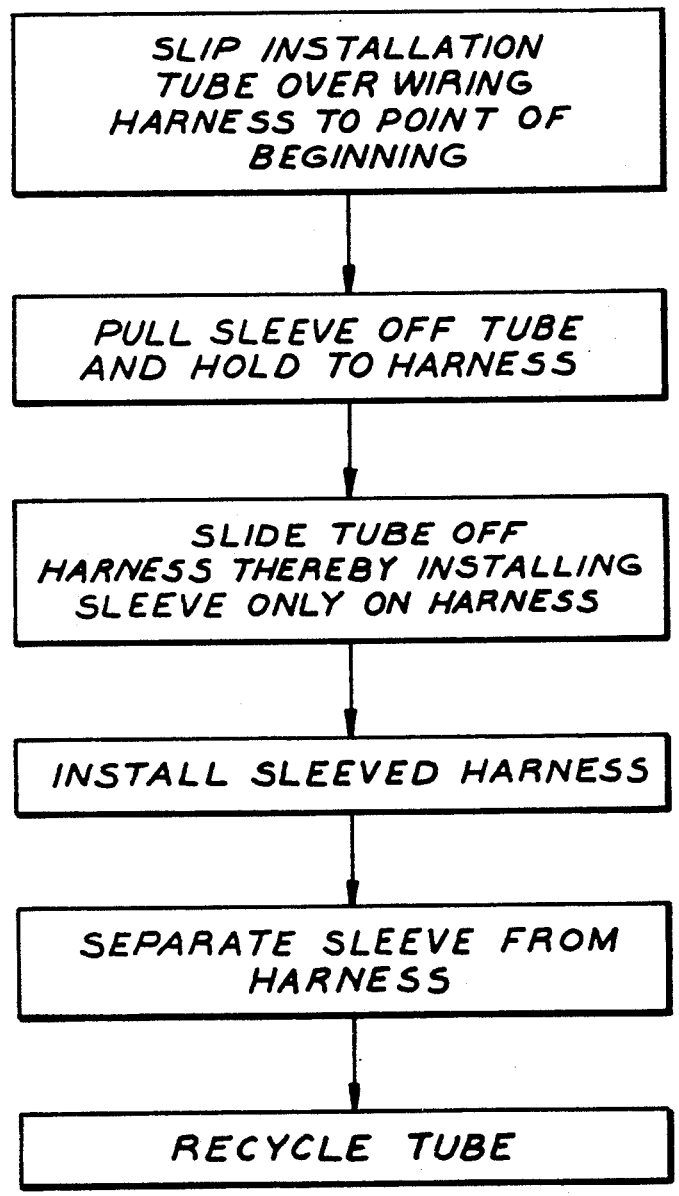
FIG. 7 is a block diagram illustrating the steps of the method of installing the installation kit on a wiring harness.

Installation Kit Component Specifications:
Total Length of Tube 40: 6 inches Length of Tube Barrel Portion 42: 5 inches Outside Diameter of Tube 40: 3.25 inches Inner Diameter of Tube 40: 3 inches Tube Material—paperboard glassine finish O.D. Sleeve As Cut Width: 5.5 inches Sleeve Length: 40 inches Sleeve Material: 2 way stretch weave; 85% nylon, 15% spandex; 4.75 oz./sq. yd.; 64 gauge Unstretched, Free State Diameter of Sleeve as Stitched: 1.6 inches Thread: Nylon or the like, not critical. Fastener: DENNISON SWIFTACHMENT—fine fabric strength, three quarter inch length As shown in FIGS. 6 and 7, to prepare the wiring harness for installation, the installation kit shown in FIG. 5 is first slipped over the harness 10 from the harness free end in the direction of the control panel 12 beginning with the lead end of the sleeve/tube, as shown in FIG. 6. The tube 40 is pushed onto the harness sufficiently far in the direction of the control panel to a predetermined position approximating that of the rubber grommet 26. With the tube 40 in this starting position, the operator then pulls the lead end of the sleeve 30 off the tube holding it to the harness. The operator then continues, with his other hand, to pull the tube off the harness in the direction of its free end. Stop shoulder 43 provides a convenient means for grasping the tube to pull it off the harness. The sleeve material will move easily off of the tube because the glassine finish offers very little resistance to the sleeve material. Once the tube is pulled past the free end of the harness, the entire harness will be sleeved as shown in FIG. 2.

At this point the control panel, with its sleeved wire harness, is ready for shipment or other transfer to its place of installation to the vehicle. During such installation, the wire harness 10 is pulled through opening 20, as previously described.

Next, the operator pulls on the paper tag 56 thus rupturing the fastener 38 at the base of stem 52 and consequently freeing the last loop 50' in the chain stitch as explained earlier. The sleeve is designed to be significantly less in diameter in its free unstretched state than that of the harness, thereby creating a significant hoop stress is generated around the sleeve in its expanded state on the harness. Because of the hoop stress in the sleeve, the chain stitch will almost instantaneously unravel along its entire length, as each chain loop 50 is pulled through the next succeeding chain loop 50, and allow the sleeve to literally fall from the wiring harness. At worst, no more is required of the operator then to grab the sleeve and give it a slight tug to pull the last several loops through the stitch and thereby release the entire sleeve from the harness. The harness will then be condition for the operator/installer to complete the connection of the electrical connectors 16 with the various electrical apparatus within the engine compartment.

In the example given above, namely a 1.6 inch diameter sleeve of the specified material, the sleeve 30 may ideally be used to wrap a harness ranging from about 2.5 to 3.0 inches in diameter. Within such a range the hoop stress generated on the stitches will be sufficient to cause the chain stitched seam to completely separate on its own upon release of the lead chain loop.

The rigid tube is reusable. The operator may, at his option, recycle it for subsequent fabrication of another installation kit.

That completes the installation sequence shown in FIG. 7.

It is understood t be that while certain forms of the present invention have been illustrated and described herein, it is not to be limited to the specific forms or arrangement of parts described and shown.

What is claimed is:

1. A kit for installing a wiring harness comprising a bundle of electrical wires, each of said wires having at a respective free common end an electrical apparatus or connector adapted to be connected to various electrical apparatus, said wiring harness commonly being adapted to be inserted through a narrow opening within a wall member or other similar type narrow pathway to a final position thereby allowing the individual wires to be coupled with a respective one of said various electrical apparatus to complete the electrical circuitry from a control panel to the electrical device being controlled or monitored, said kit comprising:
   a substantially rigid tube,
   a flexible sleeve of a length considerably greater than said rigid tube, said flexible sleeve being elastically expanded onto said rigid tube,
   said flexible sleeve being axially folded on said rigid tube from a leading end thereof, thereby having a folded length no greater than said rigid tube,
   said flexible sleeve having a separable seam closed by a quick-release type chain stitch,
   said flexible sleeve further including stitch release means for quickly releasing said chain stitch beginning at one end of said flexible tube.

2. A kit for installing within a vehicle a wiring harness comprising a bundle of electrical wires, each of said wires having at a free end an electrical apparatus or connector adapted to be connected to various electrical apparatus within the engine compartment of the vehicle, said wiring harness commonly being adapted to be inserted through a narrow opening within a wall member separating the engine compartment from an interior control panel within said vehicle, thereby allowing said wires to be coupled with and complete the electrical circuitry from the control panel to the electrical devices within said engine compartment being controlled or monitored, said kit comprising:
   a substantially rigid tube having a stop means at a distal end portion thereof,
   a flexible sleeve of a length considerably greater than said rigid tube, said flexible sleeve being of an elastically expandable fabric and being stretched over said rigid tube and mounted thereon in tension around the circumference thereof,
   said flexible sleeve being axially folded on said rigid tube from a leading end thereof and abutting against said stop means, thereby having a folded length no greater than said rigid tube,
   said flexible sleeve having a separable seam closed by a quick-release type chain stitch,
   said flexible sleeve further including stitch release means for quickly releasing said chain stitch beginning at one end of said flexible sleeve.

3. A kit set forth in claim 1 wherein:
   said tube is constructed of paperboard and includes a barrel portion and a stop means at a distal end portion thereof, and said flexible sleeve being in abutting engagement with said stop means.

4. A kit set forth in claim 2 wherein:
   said stop means further provides a pull means for allowing the operator to grasp the tube as said flexible sleeve is being pulled from the tube onto a wiring harness.

5. A kit set forth in claim 3 wherein:
   said stop means comprises a paperboard ring of significantly less length than said tube secured to one end and in telescoping engagement with the outer diametrical surface of said tube.

6. A kit as defined in claim 1 wherein:
   said flexible sleeve is made of a predominantly nylon fabric having at least about eighty percent stretch lengthwise and at least about one hundred seventy percent stretch circumferentially.

7. A kit set forth in claim 1 wherein:
   said flexible sleeve is made of a predominantly nylon stretch material comprising 85 percent nylon fibers and 15 percent spandex fibers.

8. A kit as defined in claim 6 wherein:
   said sleeve seam extends for substantially the entire length of said sleeve, and said chain stitch includes a single continuous thread passed through said sleeve and interlooped with itself on the opposite side of said sleeve to form a succession of interlocked chain loops.

9. A kit set forth in claim 8 wherein:
   the final said chain loop of said seam is held in interlocking relation with the next preceding loop by means of said stitch release means passing through said final chain loop.

10. A kit set forth in claim 9 wherein said quick release means is an elongated plastic fastener having a frangible central section and two enlarged ends.

11. A kit as defined in claim 2 wherein:
   said tube is constructed of cardboard and includes a barrel portion and a stop means at a distal end portion thereof, and said flexible sleeve being in abutting engagement with said stop means;

said stop means further providing a pull means for allowing the operator to grasp the tube as said flexible sleeve is being pulled from the tube onto a wiring harness;

said stop means comprising a cardboard ring of significantly less length than said tube secured to one end and in telescoping engagement with the outer diametrical surface of said tube;

said flexible sleeve being made of a predominantly nylon fabric having at least one hundred percent stretch lengthwise and circumferentially;

said sleeve seam extending for substantially the entire length of said sleeve, and said chain stitch including a single continuous thread passed through said sleeve and interlooped with itself on the opposite side of said sleeve to form a succession of interlocked chain loops; and the final said chain loop of said seam being held in interlocking relation with the next preceding loop by means of said stitch release means passing through said final chain loop.

12. A kit for installing a wiring harness comprising a bundle of electrical wires, each of said wires having at a respective free common end an electrical apparatus or connector adapted to be connected to various electrical apparatus, said wiring harness commonly being adapted to be inserted through a narrow opening within a wall member or other similar type narrow pathway to a final position thereby allowing the individual wires to be coupled with a respective one of said various electrical apparatus to complete the electrical circuitry from a control panel to the electrical device being controlled or monitored, said kit comprising:

a substantially rigid tube, a flexible sleeve of a length considerably greater than said rigid tube, said flexible sleeve being elastically expandable and stretched over said rigid tube so as to be constrictively mounted thereon in tension around the circumference thereof, said flexible sleeve being axially folded on said rigid tube from a leading end thereof, thereby having a folded length no greater than said rigid tube, said flexible sleeve having a longitudinally extending separable seam, said flexible sleeve further including a quick-release type seam release means disposed on said seam and precluding the parting of said seam until such time as an operator shall withdraw the release means whereby the tension about the circumference of said flexible sleeve shall cause the seam to be parted serially along its entire length.

* * * * *